United States Patent Office 2,700,003
Patented Jan. 18, 1955

---

2,700,003

PROCESS OF ARTIFICIALLY COLORING MINERAL SURFACING GRANULES

Henry R. Gundlach, Baltimore, Md., and Clinton Grove, Basking Ridge, N. J., assignors to Central Commercial Company, Chicago, Ill., a corporation of Illinois No Drawing. Application October 15, 1951, Serial No. 251,459

8 Claims. (Cl. 117—100)

This invention relates to granulated mineral surfacing material and more particularly to roofing granules of such materials as trap, andesite, rhyolite, serpentine, feldspar, argyllite, slate and many other types of rock prepared by grinding the material and screening to the required dimensions, and to the method of forming on said granules a weatherproof, insoluble color coat.

This application is a continuation in part of our copending application Serial No. 20,605, filed April 12, 1948, and now abandoned.

The instant invention has for its primary object the provision of a new and improved color coated mineral granule which is the resulting product of a new and improved and greatly simplified method of color coating mineral granules for use in surfacing the asphaltic coating on roofing sheets and shingles and other structural objects.

Another object is the provision of a method providing for greatly improved adhesion of the color coat to the base granule and permanence thereof after exposure to weather.

A still further object is the production of a coating which is dense and stronger in color and is characterized by its definite luster, thereby greatly increasing the utility and attractiveness of the granule.

A still further object is the provision of an inexpensive method of producing colored mineral granules of superior quality and at lower cost than heretofore has been possible with methods of the prior art.

A still further object is the provision of a method which enables satisfactory use of a very wide range of rocks.

We have discovered that when one or more selected metallic compounds such as magnesium, barium, aluminum, or equivalent compounds, and a necessary minimum amount of iron or suitable compounds thereof such as iron oxide are first dissolved in phosphoric acid to form an acid phosphate solution and the pigment then added and the mixture applied to the granules by mixing and heating by any well known means such as a rotary kiln, to a temperature of 400° F. to 1200° F., an artificially colored granule of greatly improved quality is produced at lower cost than heretofore possible with methods of the prior art. The action of the heat accelerates the attack of the acid on the base granule providing for excellent adhesion of the color coating thereto. The heating of the coated granule results in the formation of insoluble pyrophosphates, metaphosphates, and other complex phosphates of such a nature as to provide great permanence of the color coating on exposure to weather. We find, too, that a color coating which is quite dense and strong in color is formed and is characterized by its definite luster making for desired attractiveness.

It has been found that in processes of the prior art employing phosphoric acid binders the reaction that takes place is a dehydration of acid phosphates to produce a mixture of metaphosphates and pyrophosphates which forms the binder and that subsequent failture of the granules is due to reversal of that reaction, whereby metaphosphates and pyrophosphates rehydrate to form acid phosphates which are to a certain extent soluble and therefore subject to weathering. We have discovered that a necessary minimum amount of iron oxide used with one or more selected metallic oxides functions as an inhibitor which prevents this reversal and that in consequence thereof the resultant granules are characterized by coatings that are permanently attached to the surfaces of the granules and are insoluble when exposed to weathering.

Following are two examples of acid phosphate solutions which have given excellent results:

Acid phosphate solution A

| | Lbs. |
|---|---|
| 75% phosphoric acid | 40 |
| Aluminum hydrate | 9 |
| Iron oxide | 1 |
| Water | 30 |

Acid phosphate solution B

| | Lbs. |
|---|---|
| 75% phosphoric acid | 40 |
| Aluminum hydrate | 6 |
| Magnesium oxide | 3 |
| Iron oxide | 1 |
| Water | 30 |

Formulae which have served to produce highly desirable color-bearing coatings employing the above named solution are:

Formula #1—Green granules

| | Lbs. |
|---|---|
| Granules | 2,000—diabase. |
| Acid phosphate solution | 64. |
| Chromic oxide pigment | 15. |

Formula #2—Red granules

| | Lbs. |
|---|---|
| Granules | 2,000—argyllite. |
| Acid phosphate solution | 64. |
| Red iron oxide pigment | 15. |

Formula #3—Blue granules

| | Lbs. |
|---|---|
| Granules | 2,000—slate. |
| Acid phosphate solution | 64. |
| Iron blue pigment | 10. |

The detailed procedure is to substantially completely dissolve compounds of certain metals in phosphoric acid and water together with a necessary or predetermined amount of iron oxide. The correct amount of pigmenting material is then added and the mixture thoroughly agitated until the pigment is uniformly dispersed in the acid-metal phosphate to provide a pigmented-acid phosphate. The mixture is then applied at the specified rate per ton of granules and the mass thoroughly mixed by proper tumbling and rolling action to uniformly coat each individual granule with the mixture. If desired the pigmented-acid phosphate mixture can also be applied in a continuous process to a stream of granules flowing at a determined rate and the pigmented-acid phosphate mixture applied at the proper rate, flowing into a rotary mixer which continuously discharges to a conveyor belt which transfers the wet coated granules to the inlet of the kiln. The burner of the kiln is adjusted to raise the temperature of the granules until the discharge temperature of the granules is from 400° F. to 1200° F. In most cases the discharge temperature is from 500° F. to 540° F.

It shall be clearly understood that the function of the iron oxide is not that it shall act as a major constituent of the binder by the formation of the acid phosphates but, instead, that it functions principally as an inhibitor to prevent rehydration of the meta and pyrophosphates of the heretofore mentioned selected metallic oxides.

In practice we have used at least ¼ pound of iron of ferric oxide per 40 pounds of 75% phosphoric acid as a necessary minimum amount. As a margin of safety, substantially more than the minimum of iron as ferric oxide per 40 pounds of phosphoric acid may be used.

The herein disclosed method is greatly simplified and less costly, as compared with coating methods of the prior art and essentially consists in preparing the acid phosphate mixture, adding the pigmenting material, and applying the mixture to and heat treating the granules at a temperature sufficient to permanently attach the color coating to the surface of the granules, yet, not high enough to affect the brilliancy of the color by chemical reaction between the pigment and the chemicals employed. Also, by reason of the chemical reactions between the herein disclosed substances, at the stated temperature, our method makes possible use of a very wide range of rocks, any of which can be coated with equal success, and similarly the method makes possible use of a large choice of color pigments, both inorganic and organic.

While mineral granules, coated in accordance with our improved method are primarily intended for use in surfacing asphalt coated roofing sheets and shingles for protection of the asphaltic coating from the effect of the sun and to add to the attractiveness of said sheets and shingles, this is but one of many uses to which said granules can be put. Artificial cement blocks, wall surfaces and various other structural bodies can, during the process of manufacturing same to be surfaced or mineralized with said granules for different ornamented effects.

In the prior Gundlach patents, Nos. 2,057,679 and 2,123,419, oxy or basic phosphates and other insoluble complex phosphates are formed immediately on addition of the phosphoric acid to the granules. The granules are then heated primarily to remove the water present but not to accelerate the setting action. Since the metallic compounds are initially in excess, the basic phosphates are incompletely converted to acid phosphates by the addition of an excess of phosphoric acid. The herein disclosed invention distinguishes from said Gundlach patents and other patents of the prior art, in that we have discovered that in order to more securely attach the pigmenting material to the granules and thereby insure fastness of color not heretofore possible, the metallic phosphates must be of the acid type in order that they will be converted by heat to meta phosphates, pyro phosphates and other insoluble phosphates and thereby form a weather-resistant binder whose properties insure permanent attachment of the pigment to the granules. By the herein disclosed process acid metal phosphates are formed to the exclusion of basic or other insoluble phosphates at any instant preparatory to the final step of heating the granules to convert same into necessary meta and pyro phosphates and other complex phosphates.

We accordingly stress those features of the invention which consist of our use of iron as a chemical is a phosphoric acid solution which includes one or more reactants such as compounds of the herein disclosed common metals or the equivalent thereof. Iron present in an acid metal phosphate definitely acts chemically by the formation of complex compounds with the phosphoric acid or acid phosphates in the coloring to inhibit rehydration of the meta and pyro phosphates which are formed during the heating of the granules by dehydration of the original acid phosphates.

What we claim as our invention is:

1. The herein described process of artificially coloring mineral surfacing granules with a thin insoluble film of colored cement which is the reaction product of phosphoric acid with one or more compounds of the common metals from the group consisting of aluminum, magnesium, zinc and barium capable of forming soluble acid metal phosphates, which process comprises the steps of forming an acid metal phosphate solution by dissolving at least one compound of the above common metals in an aqueous solution of 75% phosphoric acid and also dissolving in the phosphoric acid at least ¼ pound of a compound of iron per 40 pounds of 75% phosphoric acid, adding coloring pigment to and agitating said acid metal phosphate solution to form a pigmented acid metal phosphate solution; applying the pigmented acid metal phosphate solution to the granules and thoroughly mixing the mass to uniformly coat the exterior surfaces of the granules therewith, then heating the granules at temperatures sufficient to convert the aforementioned soluble acid metal phosphates into meta phosphates, pyro phosphates and other insoluble complex phosphates to thereby permanently attach the coloring pigment to the exterior surfaces of said granules.

2. The process as described in claim 1 wherein the temperature range employed in heating the granules is from 400° to 600° F.

3. The process as described in claim 1 wherein the temperature range employed in heating the granules is from 400° to not above 1200° F.

4. The herein described process of artificially coloring mineral surfacing granules with a thin insoluble weather-resistant film of colored cement which is the reaction product of phosphoric acid with a metallic compound capable of reacting with phosphoric acid to form an acid metal phosphate solution, which process consists in forming a pigmented acid metal phosphate solution by adding a pigmenting material to a preformed acid metal phosphate solution consisting of 75% phosphoric acid, iron to the extent of at least ¼ pound of iron per 40 pounds of 75% phosphoric acid and at least one compound of the common metals selected from the group consisting of aluminum, magnesium, zinc and barium; coating the granules with said pigmented acid metal phosphate solution and heating the granules to temperatures sufficient to form on the surface of the granules a thin insoluble film of weather-resistant colored cement, the iron in solution in said pigmented acid metal phosphate solution functioning as a chemical which, by the formation of complex compounds with the phosphoric acid and acid phosphates, inhibits rehydration of the meta and pyro phosphates which are formed during the heating of said granules by dehydration of the original acid phosphates with resultant formation on the granules of a film of colored cement consisting of meta phosphates, pyro phosphates and other insoluble complex phosphates for permanent attachment of the pigmenting material to the granules.

5. The process as described in claim 4 wherein the temperature range in the heating of the granules is from 400° to 540° F.

6. The process of forming weather-resistant colored coatings on mineral surfacing granules which comprises dissolving in an aqueous binder solution of 75% phosphoric acid and at least one of the soluble compounds of the common metals selected from the group consisting of aluminum, magnesium, zinc and barium capable of reacting with the phosphoric acid to form soluble acid metal phosphates, in which solution there is also dissolved an inhibiting material consisting of a compound of iron in an amount at least ¼ pound per 40 pounds of said 75% phosphoric acid, adding a pigmenting material to the solution to form a pigmented acid metal phosphate solution, then applying the pigmented acid metal phosphate solution to the granules to uniformly coat the granules therewith and heating the granules to temperatures sufficient to convert the aforementioned soluble acid metal phosphates into meta and pyro phosphates and other insoluble complex phosphates to thereby permanently attach the pigmenting material to said granules by a coating which is the reaction product of phosphoric acid and consists of meta and pyro phosphates and other insoluble complex phosphates.

7. The process as described in claim 6 wherein the heating of the granules is at temperatures ranging from about 400° to not above 1200° F.

8. The process as described in claim 6 wherein about 64 pounds of the pigmented acid metal phosphate solution per 2,000 pounds of granules is used.

References Cited in the file of this patent

UNITED STATES PATENTS

| Number | Name | Date |
|---|---|---|
| 2,057,679 | Gundlach | Oct. 20, 1936 |
| 2,123,419 | Gundlach | July 12, 1938 |
| 2,133,728 | Teetor | Oct. 12, 1938 |
| 2,281,167 | Nichols | Apr. 28, 1942 |
| 2,425,151 | Greger | Apr. 5, 1947 |